United States Patent
Torkkola et al.

(10) Patent No.: US 7,292,152 B2
(45) Date of Patent: Nov. 6, 2007

(54) METHOD AND APPARATUS FOR CLASSIFYING VEHICLE OPERATOR ACTIVITY STATE

(75) Inventors: Kari Torkkola, Chandler, AZ (US); Noel S. Massey, Carpentersville, IL (US); Robert H. Leivian, Tempe, AZ (US)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 10/748,549

(22) Filed: Dec. 30, 2003

(65) Prior Publication Data

US 2004/0252027 A1 Dec. 16, 2004

Related U.S. Application Data

(60) Provisional application No. 60/477,977, filed on Jun. 12, 2003.

(51) Int. Cl.
*G08B 23/00* (2006.01)
(52) U.S. Cl. ............. 340/576; 340/426.2; 340/995.13; 340/905; 340/439; 701/29; 701/33
(58) Field of Classification Search ........... 340/576, 340/995.13, 426.19, 426.2, 426.31, 426.32, 340/426.34, 905, 901, 438, 439, 426.13; 701/1, 29, 33, 34
See application file for complete search history.

(56) References Cited

U.S. PATENT DOCUMENTS

| | | | |
|---|---|---|---|
| 4,155,525 A * | 5/1979 | Peter-Contesse ............ 244/182 |
| 4,853,720 A * | 8/1989 | Onari et al. ................. 701/110 |
| 4,892,014 A | 1/1990 | Morell et al. |
| 5,642,093 A * | 6/1997 | Kinoshita et al. ........... 340/439 |
| 6,188,945 B1 * | 2/2001 | Graf et al. ..................... 701/58 |
| 6,232,874 B1 * | 5/2001 | Murphy ................. 340/426.19 |
| 6,389,332 B1 | 5/2002 | Hess et al. |
| 6,401,029 B1 * | 6/2002 | Kubota et al. ............... 701/201 |
| 6,587,755 B1 * | 7/2003 | Smith et al. .................... 701/1 |
| 6,909,947 B2 | 6/2005 | Douros et al. |
| 6,925,425 B2 | 8/2005 | Remboski et al. |
| 2002/0091473 A1 * | 7/2002 | Gardner et al. ............... 701/35 |
| 2002/0111738 A1 * | 8/2002 | Iwami et al. ................ 701/211 |
| 2004/0037236 A1 | 2/2004 | Massey et al. |

(Continued)

FOREIGN PATENT DOCUMENTS

DE 10103401 8/2002

(Continued)

OTHER PUBLICATIONS

William W. Cohen, fast effective rule induction, 1993, AT and T Bell laboratories.*

(Continued)

*Primary Examiner*—Benjamin C. Lee
*Assistant Examiner*—Daniel Previl (57) ABSTRACT

An apparatus and method for classifying a driver's activity state use sensor data relating to at least one vehicle operating condition to determine driver activity and classify into one of at least two states. A two state classifier (200) uses inputs related to vehicle monitors (210), driving conditions (212), driver activity (214), vehicle controls (216), and driver identification (218) to set an output (204) to a status corresponding to "maneuver" and "non-maneuver."

24 Claims, 2 Drawing Sheets

U.S. PATENT DOCUMENTS

| | | | |
|---|---|---|---|
| 2004/0088095 | A1 | 5/2004 | Eberle et al. |
| 2004/0088205 | A1* | 5/2004 | Geisler et al. .............. 340/576 |
| 2004/0124971 | A1 | 7/2004 | MacTavish et al. |
| 2005/0143884 | A1 | 6/2005 | Bihler et al. |

FOREIGN PATENT DOCUMENTS

| | | |
|---|---|---|
| DE | 10153987 | 5/2003 |
| EP | 0771686 | 5/1997 |
| KR | 2000-0061157 | 10/2000 |

OTHER PUBLICATIONS

Boer, Erwin R., "Behavioral Entropy as a Measure of Driving Performance."

Cohen, William W., "Fast Effective Rule Induction."

Liu, Andrew, et al., "Towards Real-Time Recognition of Driver Intentions," IEEE pp. 236-241 (1998).

Mitrovic, Dejan, "Driving Event Recognition by Hidden Markov Models," IEEE, pp. 110-113 (1999).

Mitrovic, Dejan, "Learning Driving Patterns to Support Navigation Decision Making: Preliminary Results."

Oliver, Nuria, et al., "Gr4aphical Models for Driver Behavior Recognition in a SmartCar," IEEE, pp. 7-12 (2000).

Remboski, Don, et al., "Driver Performance Improvement Through the Driver Advocate: A Research Intiative Toward Automotive Safety," Society of Automotive Engineers, Inc., (2000).

Salvucci, Dario D., "Predicting the Effects on In-Car Interface Use on Driver Performance: An Integrated Model Approach," International Journal of Human-Computer Studies, pp. 1-39 (2001).

Tanaka, Jun, et al., "Workload of Using a Driver Assistance System," IEEE, pp. 382-386 (2000).

Wada, Fumio, et al., "Information Presentation Based on Estimation of Human Multimodal Cognitive Load," IEEE, pp. 2924-2929 (2001).

Wood, Chip, et al., "Driver Advocate Tool."

International Search Report for PCT/US04/18588 completed Sep. 9, 2004.

Oliver, Nuria et al., "Gr4aphical Models for Driver Behavior Recognition in a SmartCar," IEEE, pp. 7-12 (2000).

Tanaka, Jun, et al., "Workload of Using a Driver Assistance System," IEEE, pp. 382-386 (2000).

Wada, Fumio, et al., "Information Presentation Based on Estimation of Human Multimodal Cognitive Load," IEEE, pp. 2924-2929 (2001).

* cited by examiner

METHOD AND APPARATUS FOR CLASSIFYING VEHICLE OPERATOR ACTIVITY STATE

This application claims benefit of 60/477,977 filed on Jun. 12, 2003.

TECHNICAL FIELD

The present invention relates generally to the field of vehicle operation, and more particularly, to a method and apparatus for classifying an activity state of a vehicle operator.

BACKGROUND

The flood of information reaching drivers—telematics, infotainment, collision warning and others—requires a new approach to the operator-vehicle interface. At present, information (such as navigation instructions, cell phone and email messages, traffic warnings, infotainment options, vehicle condition monitoring, etc.) is presented to the vehicle operator asynchronously taking no account of how demanding the driving task might be in a given moment. For example, a "check engine" indicator light might light up among the instruments at the same time a driver is putting a CD into the stereo system, while the navigation system screen displays an upcoming turn and gives a verbal description of that turn, as a cell phone call comes into the car and the driver is engaged in conversation with one or more passengers.

Human beings have a finite ability to perceive the environment, to attend to elements of the environment, to cognitively process the stimuli taken in, to draw appropriate meaning from perceptions, and to act appropriately upon those perceived meanings. Furthermore, there is great variation within the driving population in both native and developed abilities to drive. Thus, vehicle operators are subject to confusion, distraction, and to ignorance, which is exacerbated by the barrage of stimuli they are now subjected to while operating a vehicle. Training, experience, and technology can be used to mitigate confusion, distraction, and ignorance. Unfortunately, in the United States there is little formal or informal training in the skills involved in driving, beyond the period when people first apply for their licenses. Driver training programs have not proven to be particularly effective, nor is training continued through the driving career. In fact, in the United States, in particular, most people think of driving as a right rather than a privilege. Further, studies show that most think of themselves as good drivers and of "the other person" as the one who creates problems. Unless and until a cultural or legal change takes place that encourages drivers to wish to improve their driving skill, it seems that technological solutions designed to minimize confusion, distraction, and ignorance have the best potential for improving the safety of the highway transportation system, which system is likely to become more crowded and, with little or no expansion of the roadway infrastructure likely to occur, therefore, also more dangerous in the future.

To address these and other safety concerns, an integrated safety system based on a state transition model has been proposed. The underlying concept is a "hierarchy of threat" model that steps through a series of states each one representing an assessment of the danger of an impending collision based on information from external object detectors and in-vehicle sensors. The states are "normal driving state," "warning state," "collision avoidable state," "collision unavoidable state," "post-collision state." Sensor and data fusion algorithms combine information from the sensors and determine the degree to which the danger of collision exists. If the system detects the danger of a collision it issues warnings to the driver or, in some situations, takes control of the vehicle and initiates automatic braking, automatic lane change, or other forms of vehicle control. This system represents an attempt to bring previously unrelated sensor information into an integrated state from which useful inference about the danger of collision may be made and warnings to the driver, or actual control of the vehicle, can be used to avoid completely or mitigate the damage from a collision.

There has also been proposed a system that provides extensive monitoring of the vehicle and traffic situation in order to prioritize presentation of information to the driver. The goal of this system is to manage the stream of information to the driver while taking account of the driving task, conditions, and the physical, perceptual and cognitive capacities of the driver. The support provided is designed to improve the driver's focus and to re-focus the attention of a distracted driver as s/he undertakes navigation, maneuvering and control of the vehicle. The overall system architecture incorporates an analyst/planner that accepts inputs from sensors, includes a stored repertoire of driving situations, and records information about the driver. Additionally, the system includes a dialogue controller for managing communication with the driver. The system also monitors the driver and integrates the driver's condition into the decisions made by the warning and control systems.

None of the existing systems undertake the monitoring of a range of sensor data, nor do they provide for evaluation of the driver's cognitive load. Such systems additionally fail to consider the driver's activity in the cockpit that is not directly related to the driving task such as opening and closing windows, tuning the radio, etc. For example, existing systems either do not monitor the driver at all, or monitor the driver relative to static "model" behavior as opposed to actual dynamic driver performance and/or habits. Thus, these systems do not provide information in synchronization with the driving task, nor do they attempt to minimize distractions.

Additionally, previous systems that have attempted to assess driver performance have been limited to lane-following capability, that is, evaluating how well the driver maintains the position of the vehicle relative to the edges of the lane in order to generate a parameter representing the driver's lane-following ability. The parameter is periodically determined, and if it falls below an established level, a warning, such as a buzzer or visual indication, is presented to the driver. This system is limited in that it only provides lane-following evaluation and does not account for deliberate lane departures such as to avoid a hazard, is not integrated to receive a spectrum of sensor input, and does not include driver condition and driver activity data.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

A system is adapted to assess information related to a vehicle's operation and information related to other possible distractions to a driver and to provide an output for use in decision making regarding further increasing the cognitive load of a driver. The output is based upon a number of conditions relating to the vehicle operation, the operating environment, and the activity of the operator and other occupants. As used throughout this specification, the terms vehicle operator and driver are used interchangeably and each are used to refer to the person operating the vehicle in the manner in which the vehicle is intended to be operated.

In another embodiment, the system may additionally identify the particular vehicle operator such that the assessment may be made relative to operator preferences, past driving performance and habits.

Figure 1:
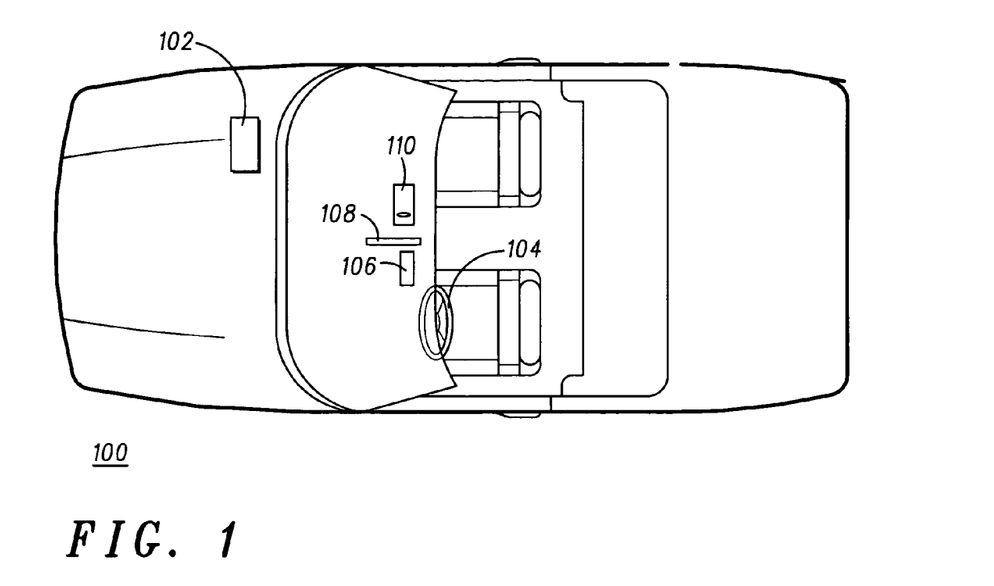
FIG. 1 depicts, in a simplified and representative form, a diagram of a vehicle.

Referring to FIG. 1, a vehicle 100 includes a classifier 102 and various visible and hidden apparatuses used in for monitoring the vehicle. Shown are a steering wheel 104, a brake pedal 106, an accelerator 108, and an entertainment unit 110. Other vehicle controls used, but not depicted, in various embodiments include the turn signal, gear shifter, door handles, and window controls. The classifier 102 is connected to sensors (not shown) that monitor and report from the various driving controls 104, 106, 108, the entertainment unit 110 and other apparatuses and sensors for both internal and external monitoring as discussed below.

Figure 2:
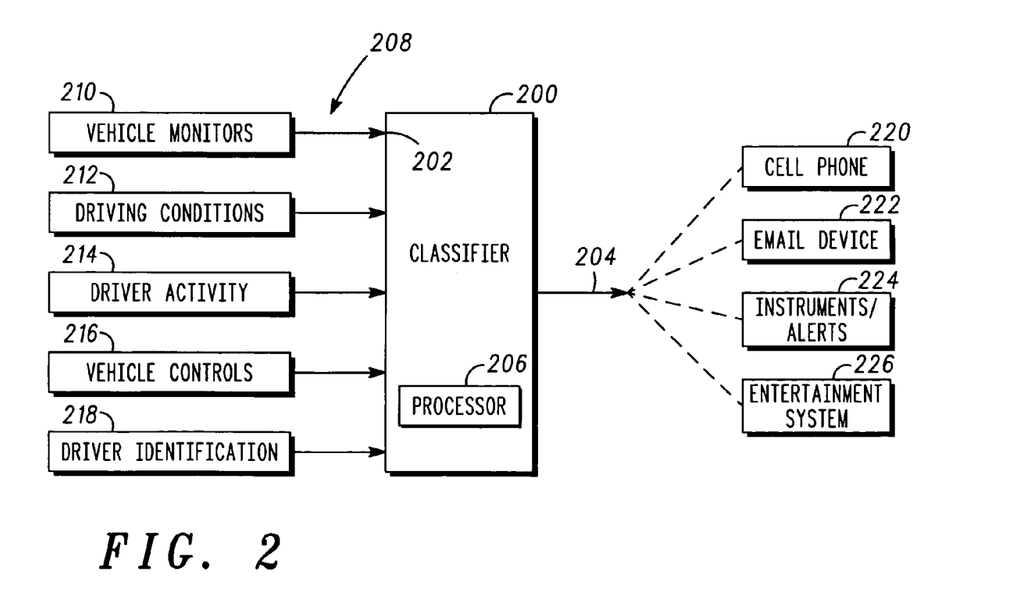
FIG. 2 is block diagram illustrating an interface of the classifier with the vehicle.

Referring to FIG. 2, a block diagram illustrating an interface of the classifier with the vehicle is discussed and described. A classifier 200, that may be the same or similar to the classifier 102, has in input 202 and an output 204. As shown, the classifier has multiple inputs 202 coupled to a harness 204 and a single output 206. In practice other configurations are likely. The input 202 and output 204 may be bussed, multiplexed, a packet interface or individual conductors. The functions of the classifier 200 are not affected by the physical layer interface.

The classifier 200 may include a suitable processing device 206, such as a microprocessor, digital signal processor, etc., one or more memory devices including suitably configured data structures, and interfaces to couple the classifier to various vehicle sensors and to provide classification information to downstream devices. The classifier 200 may be an integrated single module or its functions may be performed as part of another vehicle computing system (not shown) such as an engine controller, body controller or entertainment controller.

Data are captured from a variety of sources, all of which may be used directly or indirectly to infer the state of the vehicle and moreover the driver's cognitive load with respect to new input. Such data encompasses data produced by the various vehicle sensors. Vehicle condition monitoring sensors are pervasive in passenger vehicles (cars, mini-vans, sport utility vehicles, etc.) and many other vehicles. These sensors monitor numerous parameters such as engine operating parameters, vehicle speed, transmission and wheel speed, vehicle acceleration in three axes, chassis function, emission control function, etc. These sensors may also provide data related to vehicle diagnostics.

Vehicle monitors 210 encompass data related to the environment in which the vehicle is operating, e.g., the road conditions, traffic conditions, weather, etc. The vehicle monitors 210 may include sensors that also provide vehicle-operating data. Vehicle location, another element of vehicle monitors 210 may be provided by an on-board navigation system utilizing global positioning system (GPS) technology, or location information may be provided by a wireless communication device (e.g., a cellular telephone) and associated wireless communication network.

Driving conditions 212, for example, road surface and traction estimates may be provided by anti-lock braking, traction control and chassis control system sensors. Radar, laser, ultra-sonic and video systems can provide a map of objects near the vehicle and their motion relative to the vehicle. Weather and time of day may also be monitored directly or derived from sources such as window wipers, lights and defrosters.

Driver activity 214 not directly related to driving may be monitored. Seat sensors and/or infrared sensors may sense the number and locations of passengers in the vehicle. Floor and steering wheel sensors may indicate the position of the driver's feet and hands. Video or imaging sensors may monitor head, body, hand and feet movements of the driver, and the operative states and driver usage of information, entertainment and telematics systems may also be monitored. Other activities that are easily monitored include adjusting the radio, using a cellular telephone, obtaining navigation information, adjusting the environmental controls, and conversation level.

The classifier 200 may also capture data directly related to vehicle operation by monitoring vehicle controls 216. While operating the vehicle, the driver is engaged in a number of different actions, such as, but certainly without limitation, applying the accelerator or brakes, turning the steering wheel, and using turn signals, windshield washer/wipers, window defoggers, etc. Data derived from the vehicle controls or other sensors may be used to evaluate cognitive load, for example, rate of change of the accelerator and brake, turn radius combined with vehicle speed, and electronic suspension settings are an exemplary few.

Due to the wide variation in human skill-levels, physical size, and personal preferences and tastes, there are many situations where it would be useful for the classifier 200 to "recognize" who is attempting to enter and/or drive the vehicle. In that regard, the driver identification interface 218 may be configured as a personal portable user interface (PPUI). A PPUI may exist in many forms, but in essence captures preference, performance and habit data associated with a particular driver. The PPUI may be encoded on a smart card, a key fob, or embedded in the vehicle to be activated by a fingerprint reader, voice recognition system, optical recognition system or other such means.

In various embodiments, the PPUI may function as a security system granting or limiting access to the vehicle or the vehicle's ignition system, and bars access to unauthorized persons or disables the vehicle when an unauthorized person attempts to drive the vehicle. The PPUI as part of the driver identification interface 202 permits each operator of the vehicle to establish choices ahead of time.

The PPUI may also function in a driver performance improvement and/or driving restriction enforcement tool. The PPUI may be used to monitor driving performance and report to a traffic enforcement authority. This would allow a habitual traffic offender to retain driving privileges in a court-monitored fashion. Driving performance may be recorded for subsequent review, and a method of improving driver performance is described herein. Additionally, the PPUI may be used to implement controls on the usage of the vehicle. For example, a parent may restrict the distances and locations a vehicle may be taken or the hours of the day the vehicle may be operated by a newly licensed driver. An employer may monitor the driving habits of its fleet drivers.

As will be appreciated, numerous sources of data exist within and about the vehicle environment that may be utilized by the classifier 200. Several data types have been described above, others will be described in connection with the operation of the classifier 200, and still others not specifically referred to herein may be used without departing from the scope and spirit of the invention. It will be appreciated that as new technologies introduce new types and sources of data and new types and sources of information into the vehicle, the classifier 200 may be adapted to utilize these additional sources of data.

In other words, the classifier 200 will monitor anything of a technical nature that the driver might be touching or using in the cockpit of the vehicle so that the classifier 200 knows as much as possible about what the driver is doing at any given moment. Further, the use of video or imaging technology, seat sensors and microphones in the cockpit allows the classifier 200 to determine the location and position of the driver, the noise level, and the presence of passengers and other potential sources of distractions. The radar, laser, video and infra-red sensors deployed around the perimeter of the vehicle monitor traffic and weather conditions, obstacles, lane markings, etc. The drivers' present condition and driving performance may be inferred from direct measures, such as video, and from comparison of current performance with past performance and known good performance practices.

Ultimately, the classifier 200 uses the available inputs to determine when the vehicle, and correspondingly, the driver is in one of at least two states: maneuver and non-maneuver. The reduction of the data to the two states is discussed in detail below.

The output 204 may be coupled to a variety of vehicle apparatuses and systems, each of which may be tailored in some fashion to use the output 204 signals from the classifier 200.

A cellular telephone 220 can be programmed to monitor the state of the output 204 and divert calls received during a time classified as "maneuver" while allowing calls to be received when the output 204 indicates "non-maneuver."

An email device 222, such as a head up display, a console unit or a personal information manager having a speech interface may be set up to delay notification of email or the display/verbalization of email messages when the output 204 indicates maneuver.

Various instruments and alerts 224 may be programmed to use the state of the output 204 in managing what information is relayed to a driver in a particular circumstance. The instrumentation and alerts interface 204 may include visual, audio, haptic or other suitable indicators. Visual indicators may include gages, lighted indicators, graphic and alphanumeric displays. These visual indicators may be located centrally within the instrument panel of the vehicle, distributed about the vehicle, configured in a heads-up-display, integrated with rearview and side view mirrors, or otherwise arranged to advantageously convey the information to the driver. The audio indicators may be buzzers or alarms, voice or other audible alerts. The haptic alerts may include using the chassis control system to provide simulated rumble stripes, pedal or steering wheel feedback pressure, seat movements and the like.

The actuation of any one or more of the indicators or alerts is controlled in order to synchronize the timing of information as it is provided to the driver. In one very limited example to illustrate the concept, a change oil soon indication may be generated by the powertrain management system on the vehicle. Previously, this indication would cause a "service engine" or "change engine oil" light to be illuminated on the vehicle instrument panel as soon as the powertrain management system generated the indication. The light suddenly appearing among the instruments may temporarily distract the driver. If at the time the light is illuminated the driver is negotiating traffic or otherwise in a situation requiring full attention to the driving task, the distraction may present a hazard. In one embodiment, the non-critical data relating to changing the engine oil may be saved until conditions allow for the information to be presented to the driver at a time less likely to create a hazard situation.

The entertainment system 226 may be programmed in a similar fashion to automatically reduce the volume level or otherwise act to lower the number and level of distractions for a driver in a situation classified as "maneuver."

In another embodiment the classifier 200 itself may determine what events to block or delay through a direct interface with the devices or by an intervening relationship between the device and its output transducer.

Since the goal is to determine whether the driver is capable of receiving additional information from a device or a service, the system is adapted to estimate the cognitive load of the driver. As discussed above, this may be done by observing the driver directly but the specialized sensors required are not likely to appear in vehicles in the near future. Advantageously, a driving maneuver may be detected from the sensor inputs available within the vehicle, rather than attempting to directly assess the state of the driver. That is, cognitive load may be directly related to the actual driving situation, and determined by assessing the driving situation via available vehicle sensors. Most previous work concentrates on driver behavior recognition and prediction, rather than on driving state recognition.

The components of the classifier are known and available. The processor 206 may be a single chip controller, a DSP, or a combination and may have integral volatile and non-volatile memory. Such processors are commercially available from companies such as Motorola.

In order for the classifier 200 to intelligently assess the driver's cognitive load it may attempt to determine the current state of the driver. One component of the driver state is the current effort required by the driver to perform the driving task. As examples, entering or exiting a freeway, making a lane change, turning a corner, and parking are typically considered 'difficult' driving tasks. In contrast, cruising on a straight free-way with no surrounding traffic or sitting at a stoplight are typically considered 'easy' driving tasks. Thus, one way to characterize driver activity may be the two state classifier 200 that separates the 'difficult' driving states, which may be called maneuver states, from the 'easy' driving states, which may be called non-maneuver states.

In the following illustrative example, the instantaneous sensor state is classified into maneuver/non-maneuver classes. That is, sensor snapshots are considered, not time sequences. This allows a simple and efficient implementation; however, it will be appreciated that time sequences may be used. Furthermore, using instantaneous sensor states eliminates time lag in the classification response time.

In order to enhance the variable set, quadratic terms of the variables, that is, all the cross-products and squares of the variables may be used. The total number of variables d is increased. For example, where 5 sensors are used, the total number of variable increases from 5 to 20 or more depending on the number of cross-products used. Also, the absolute value of the output of sensors having corresponding negative and positive outputs may be used. For example, the steering wheel angle being negative for left turns and positive for right turns may be changed to its absolute value. The same may be done to the turn signal indication.

Several different statistical data classifiers may be used to provide the maneuver/non-maneuver classification. One could code a classifier in a traditional language such as C or Java using 'IF-THEN-ELSE' logic or use an automatic system. Such an automatic system could be, for example, a C4.5 classifier, such as Quinlan's C4.5 in the Weka toolkit called J48, described in Witten, et al., Data Mining: Practical machine learning tools with Java implementation, Morgan Kaufmann, San Francisco, may be used. Classifiers require training using collected data that is annotated to provide examples of maneuvers and non-maneuvers. The C4.5 builds decision trees based on information gained at each split. This C4.5 also supports pruning. The resulting output is a decision tree, which is then converted into rules and used in the system to provide the maneuver/non-maneuver classification from the sensor data.

In an alternative example, a Repeated Incremental Pruning to Produce Error Reduction, RIPPER, pro-positional rule learner may be used. The RIPPER may be an optimized version of IREP described in Cohen, Fast effective rule induction. Machine Learning: Proceedings of the Twelfth International Conference, Lake Tahoe, Calif. The implementation may be a JRip classifier in the Weka toolkit described above. This model has options to specify the number of folds for reduced error pruning (where one fold is used as the pruning set), the minimal weights of instances within a split, the number of runs of optimizations, the seed of randomization, whether or not to check the error rate >=0.5 in stopping criteria, and whether or not to use pruning. The resulting output is a list of rules in human readable form and can be inspected and easily translated into rules in other programming languages.

In another alternative embodiment, a quadratic classifier may be trained using the standard least-squares pseudoinverse approach after having generated the quadratic terms. Denoting the training data matrix of n rows and d+1 columns (a constant column needs to be concatenated to the data) by X, and the target column vector by D, which contains +1 for maneuver instances, and −1 for non-maneuver instances, the least squares solution for the weights of the classifier is:

$$w = X^+ D,$$

where $$X^+ \equiv (X^T X)^{-1} X^T.$$

A regularized solution can be formed by:

$$w = (X^T X + \lambda I)^{-1} X^T D.$$

In the actual recognition operation, given a row vector x of the sensor inputs, their quadratic expansions, and the concatenated constant value of one, the final output of the classifier is d=xw, which should be positive for a maneuver.

A driving simulation device, such as the GlobalSim HyperDrive authoring tool, may be used to create a driving world scenario for developing model data. The virtual drive may simulate a number of kilometers of multi-lane beltway with on and off-ramps, overpasses, and two and three-lane traffic in each direction (separated by a grass median) or other driving events. Interior to the belt-way, connecting to mid-side overpass, may be varied two-lane roads—urban, suburban, industrial, and rural environments. These roads may cross at light controlled intersections. The drives may use day-time dry-pavement driving conditions with good visibility, or the driving conditions may be made more difficult.

For a high-density driving environment, a number of "distracter" vehicles may be added to the highway scenario along with high-density random "ambient" traffic. These distracter vehicles may be randomly programmed to drive between ±10 percent faster/slower than the posted speed limit, providing the impression of a steady flow of normal traffic around the subject car. All distracter vehicles simulated alert, "good" driver behavior and reacted reasonably to any particular maneuver from the subject driver.

This arrangement allows a variety of traffic conditions and road types within a confined, but continuous driving space. Opportunities for passing and being passed, traffic congestion, and different levels of driving difficulty may thereby be encountered during the drive.

Data may be collected from a number of drivers. For example, data may be collected from four drivers each driving about 15 minutes in the simulated world. Drivers may be instructed to engage in all possible maneuvers they could think of. All variables and all channels of video may be saved, even though the classifier may make use of only a subset of the available variables and data. For example, the above described five variables accelerator pedal position, brake pedal position, speed, turn signal state (left, off, or right), and steering wheel position may be used as inputs. These five variables may be downsampled to 5 Hz so that of about one hour of driving, 19700 samples of data may be obtained. To create the target labels (maneuver or non-maneuver), the data was annotated by hand using a tool that combines video playback with graphical visualization of selected variables of the collected data.

To evaluate the three classifiers, a four-fold cross-validation (leave-one-out) may be used. One of the four drivers was left out of the test data set, and the three other drivers were used as the training set of the classifier. All presented figures are averages of four such runs. Table 1 presents the final comparison of the three classifiers in terms of their error rates in maneuver/non-maneuver classification.

TABLE 1

Comparison of the error rates of the three classifiers using four-fold cross-validation.

|  | C4.5 | Ripper | Quadratic classifier |
| --- | --- | --- | --- |
| Error rate | 19.5% | 18.2% | 18.8% |

The single parameter in the quadratic classifier is the regularization coefficient. The optimum value may be determined through driver-independent cross-validation experiments. A regularization coefficient may provide the best generalization across drivers.

Implementation of the quadratic classifier in classifier 200 after having trained the weight vector is particularly straightforward. First, the quadratic terms are computed from the incoming sensor data stream, after which the actual classifier is implemented simply as an inner product of the weight vector with the sensor data vector (concatenated with a constant), and comparing the result to zero to make a maneuver/non-maneuver decision.

The major parameter value of C4.5, the minimum allowed number of training instances in a leaf, may also be determined using cross-validation. The best generalization across drives was obtained by leaf size of 400, with an error rate of 19.5 per cent. The smallest leaf size used was two, and the largest was 700.

C4.5 allows generation of a decision tree that is easily transformed into rules in Java and used in the system 100. Following is an example tree that may be generated using the optimal parameter settings.

```
steeringWheel_absXsteeringWheel_abs <= 3.066
| turnSignalStates_abs = 0
| | brakeXspeed <= 0.000008
| | | speed <= 56.0283
| | | | speedXsteeringWheel_abs <= 9.57928: -1
| | | | speedXsteeringWheel_abs > 9.57928: 1
| | | speed > 56.0283: -1
| | brakeXspeed > 0.000008: 1
| turnSignalStates_abs = 1: 1
steeringWheel_absXsteeringWheel_abs > 3.066: 1
```

The RIPPER produced rules that are also easily added to the system 100. The described example used 24 rules. An exemplary rule, which was derived from the training set, is listed below:

```
if ( (steeringWheel_abs >= 0.073832) &&
    (speed <= 64.8699) &&
    (speed*steeringWheel_abs >= 10.5426) &&
    (accelerator*speed <= 46.0659) &&
    (accelerator >= 0.47251))
    then isManeuvering = true;
```

Figure 4:
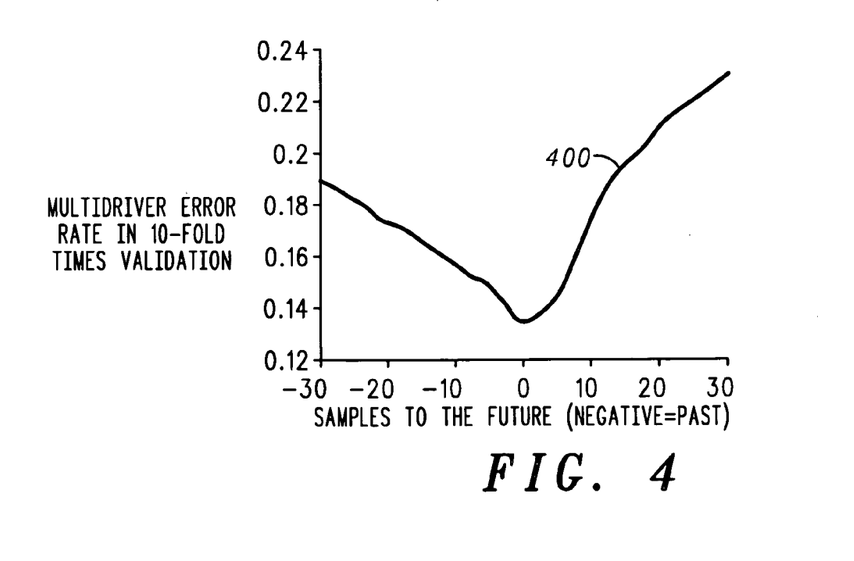
FIG. 4 is a graph depicting maneuver classification error rate as a function of time shift between the current variable values and the target.

In addition to trying to classify the current time instant to one of the two classes, it may be possible to predict future maneuvers (and postdiction of past maneuvers). The results are depicted by line 400 in FIG. 4. A quadratic classifier may be used, data from all drivers may be pooled to single multi-driver database, and tenfold cross-validation may be used to derive the error rates. As can be expected, prediction of the future is harder than recognizing the past. FIG. 4 also gives an idea of how much information about the current maneuver state is carried by other variables as a function of time. Based on FIG. 4, it should be beneficial to include the past states of the variables as inputs to the classifier, in addition to current values.

All three classifiers have been implemented in the simulator to assess their operation in real-time driving. Even though the accuracies of the classifiers were quite close together using testing data, in on-line operation it was observed that the tree-based and the rule-based classifiers missed some important maneuvers, while the quadratic classifier detected those. In hindsight, rather than looking at the error rate, it may be advantageous to optimize the precision of the classifier in detecting the maneuver state. This was higher for the quadratic classifier. Furthermore, the variance of the error rate across drivers was the smallest with the quadratic classifier.

While the classifiers have been described as being used independently, they may be used in combination to classify operation cognitive load. Such an implementation may permit selective use of one or more classifier as circumstances dictate.

Referring again to FIG. 2, and as previously noted, the classifier 200 receives all of the various sensor inputs, including those measuring vehicle condition, driver condition, driver activity and operating environment (e.g., weather, road and traffic conditions), and produces a set of conditions or master condition list. The conditions represent the current discrete state of each thing the classifier 200 is monitoring. For example, the speed condition may be in one of the following states at any point in time: "stopped," "slow," "normal," "fast," and "speeding." The states are determined based upon learned thresholds between the states and based on history and known good practices. The classifier 200, given the master condition list, evaluates the current drivers tasks and activities, such as tuning the radio, listening to e-mail or other potentially distracting tasks, to produce an estimated driver cognitive load. The cognitive load of each static task may be determined externally by controlled experiments with a set of test subjects (e.g., tuning the radio might use 15.4 percent of a driver's attention). The total cognitive load is the weighted sum of each of the individual tasks. The weighting may be fixed or may change, for example exponentially, given the number of concurrent tasks.

One particular example of potential driver distraction relates to usage of cellular telephones. As described, the classifier 200 provides information regarding operator cognitive load. For example, an enabled cell phone 220 may provide two potential cut-offs of cellular telephone calls to a driver without completely prohibiting calls. In the first instance, the caller is informed, by a pre-recorded message, that the call is being completed to a person presently driving a vehicle. The caller is then given the option of having the call sent directly to voice mail or putting the call through to the driver. Before the call is completed to the driver, the cell phone 220 consults the output of the classifier to determine when the potential for driver distraction is beyond certain desired limits, e.g., the required driver cognitive load will exceed a threshold, the incoming call may be held and/or automatically transferred to voice mail with an appropriate pre-recorded message.

A cell phone 220 using the output 204 may be configured to substantially limit the number of calls coming in to the driver. Many times a caller does not know the person they are calling is driving, and if they did, may not have called. As described above, the cell phone 220 provides a mechanism for informing the caller that they are calling a driver and provides the option to divert the call to voice mail. Alternatively, the cell phone 220 may be configured to give the driver the option of accepting calls transparent to the caller. In such an arrangement the incoming call is identified to the driver via a hands-free voice interface. The driver may then accept the call, refer the call to voice mail, refer the call to a forwarding number or to terminate the call, all of which may be accomplished without the caller's knowledge. Alternatively, the call completion may be delayed shortly, with an appropriate message being provided to the caller. The system 100 may then complete the call after the short delay once it is determined that the driver's cognitive load is at an acceptable level.

The cell phone 220 may also be adapted to take "corrective" action in the event that an on-going call is coupled with an increase in the driver's cognitive load. If after accepting a cellular telephone call the classifier 200 determines that the driver's cognitive load has increased beyond a threshold level cell phone 218 may automatically suspend the cellular telephone call. In such instance, a message is provided that informs the caller they are being temporarily placed on hold. The cell phone 220 or an associated network service (not depicted) may also offer the caller an option to leave a voice mail message. Additionally, so that the driver is aware of the call interruption, an appropriate message is provided to the driver indicating that the call has been placed on hold. The driver likewise may refer the caller to voice mail. Once on hold, the caller may have the option of leaving a voicemail, being forwarded to an alternate number, or waiting until the driver can resume the conversation.

As with other aspects of the operation, the driver's preferences as to cellular telephone usage is provided via the driver identification interface 218. The classifier 200 may also operate with other wireless communication devices including personal digital assistants (PDAs) and pagers for receiving email and text and data messages.

To take advantage of the ability of the cell phone 220 to prioritize incoming cellular telephone calls based on driver cognitive load requires the cellular telephone 220 be communicatively coupled to the classifier 220 and to perform specialized functions as described.

Figure 3:
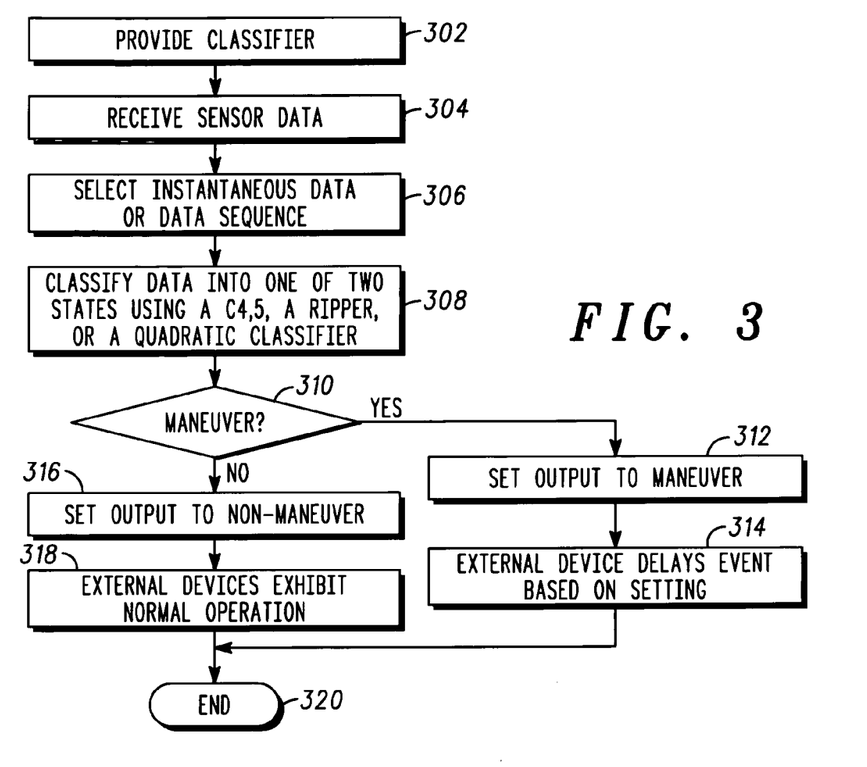
FIG. 3 is method of classifying the activity state of a driver.

Referring to FIG. 3 a method of classifying the activity state of a driver is discussed. A two-state classifier 200 is provided 302 capable of performing algorithmic analysis of data from one or more inputs. The classifier 200 receives 304 sensor data relating to at least one vehicle operating condition. In one embodiment, data is received from a second sensor data relating to a condition of the driver, a condition of the passenger compartment, for example, number of occupants, and a condition of a passenger, for example, without a seat belt buckled. Some or all of the data used to classify the state may be selected 306 from instantaneous sensor data or a time sequence of sensor data. Both the collected data and derivative data may be used to analyze the activity state of the driver. For example, both the position and the rate of change of the position of the accelerator, brake, steering wheel, clutch and gear selector all provide valuable information about the level of activity of the driver and by implication, the driving conditions the driver is encountering. Classifying the driver activity may use one a C4.5 algorithm, a RIPPER algorithm or a Quadratic classifier, as discussed above.

The selected classification algorithm, whether one of the above, another algorithm or a combination is used to classify 308 the driver activity into one of at least two states based upon the sensor data. One state corresponds to a maneuver activity and another state corresponds to a non-maneuver activity. Some embodiments may include more than two states to further allow classification of driver cognitive activity beyond two states. For example, an embodiment could classify driver state into 4 or more levels such as "low," "moderate," "high," and "extreme." The connected devices or a central controller can then take appropriate actions as predetermined. Some activities that may result in classifying the state of the driver activity as maneuver can include a change in the position of a vehicle with respect to a driving lane, a parking maneuver, freeway ingress, freeway egress, communication with an external party, an interaction with another occupant of the vehicle or the settings (especially volume) of an entertainment device. Not being engaged in one or more the above activities may result in classification as non-maneuver.

When a maneuver is determined 310, the yes branch of 310 is followed and the output 204 is set 312 to a state corresponding to "maneuver" that is understood by mutual agreement of other connected systems, for example, a logical 1. A connected external device or system 220, 222, 224, 226 may then use the output 204 to delay 314 or redirect a service or feature offered in the vehicle or otherwise reduce the cognitive load on the driver. Some of the services and features that may redirected or delayed are a wireless communication, a vehicle condition alert such as a wiper fluid signal, a navigation instruction, an email message, or an entertainment presentation. For example, both the volume of the radio may be reduced and a cellular telephone call may be redirected to voice mail when the driver cognitive load is determined to be particularly high.

The invention has been described in terms of several preferred embodiments, and particularly to systems and methods for synthesizing and summarizing information and the presentation of information to a driver. Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications, which come within the scope of the appended claims is reserved.

We claim:

1. A method of classifying an activity state of a driver, the method comprising:

providing a statistical classifier, the statistical classifier being at least one of a C4.5, a RIPPER, and a Quadratic classifier, and configuring the statistical classifier as an at least two-state activity classifier operable to recognize at least a first driving state corresponding to a maneuver activity and a second driving state corresponding to a non-maneuver activity;

receiving sensor data relating to at least one vehicle operating condition;

classifying the driver activity using the configured statistical classifier into one of the at least first and second driving states based upon the sensor data; and utilizing the classified state of the at least first and second driving states to determine whether to send an event to the driver of the vehicle.

2. The method of claim 1 wherein classifying the driver activity into the first driving state corresponding to the maneuver activity further comprises:

classifying the state of the driver activity as a maneuver when engaged in an activity corresponding to one of a change in the position of a vehicle with respect to one or more vehicles or stationary objects, a parking maneuver, a freeway ingress, a freeway egress, a communication with an external party, an interaction with another occupant and a state of an entertainment device.

3. The method of claim 1 wherein classifying the driver activity into the second driving state corresponding to the non-maneuver activity further comprises:

classifying the state of the driver activity as a non-maneuver when disengaged from an activity corresponding to one of a change in the position of a vehicle with respect to a one or more vehicles or stationary objects, a parking maneuver, a freeway ingress, a freeway egress, a communication with an external party, an interaction with another occupant, and a state of an entertainment device.

4. The method of claim 1 further comprising:
receiving a second sensor data relating to at least one of a condition of the driver, a condition of a passenger compartment, and a condition of a passenger.

5. The method of claim 1 wherein classifying the driver activity further comprises analyzing a position and a rate of change of the position of one of an accelerator, a brake, a steering device, a turn signal selector, a clutch and a gear selector.

6. The method of claim 1 wherein classifying the driver activity further comprises classifying the driver activity using one of instantaneous sensor data and prior sensor data.

7. The method of claim 1 further comprising:
altering presentation of the event in the vehicle when the classified state is the first driving state corresponding to the maneuver activity.

8. The method of claim 1 wherein the event is one of a wireless communication, a vehicle condition alert, a navigation instruction, an email message, and an entertainment presentation.

9. A two-state classification apparatus for classifying an activity state of a driver, the classification apparatus comprising:
an input for receiving sensor data relating to at least one vehicle condition; and
a processor coupled to the input, wherein the processor analyzes the sensor data to determine a classification of the activity state of the driver using a statistical classifier, wherein the statistical classifier used by the processor is at least one of a C4.5, a RIPPER, and a Quadratic classifier that is configured as an at least two-state activity classifier operable to recognize at least a first driving state corresponding to a maneuver activity and a second driving state corresponding to a non-maneuver activity, and wherein the processor determines the classification of the activity state of the driver using the statistical classifier as one of a maneuver and non-maneuver and utilizes the classification of the activity state to determine whether to send an event to the driver of the vehicle.

10. The classification apparatus of claim 9 further comprising an output for conveying a signal relating to the classification of the activity state of the driver.

11. The classification apparatus of claim 9 wherein the classification of non-maneuver enables the event in the vehicle.

12. The classification apparatus of claim 9 wherein the classification of maneuver delays the event in the vehicle.

13. The classification apparatus of claim 12 wherein the event is a notification of a change in state of an other apparatus in the vehicle.

14. The classification apparatus of claim 9 wherein the sensor data corresponds to one of an instrumentation data, a vehicle control data, a driver condition data, and a driver activity data.

15. The classification apparatus of claim 9 wherein the processor analyzes the sensor data corresponding to a driver identification.

16. The classification apparatus of claim 9 wherein the at least one vehicle condition is one of a vehicle mechanical condition, a vehicle passenger compartment condition, a driver state and a passenger state.

17. The classification apparatus of claim 9 wherein the at least one vehicle condition is one of an accelerator pedal position, a brake pedal position, a vehicle speed, a turn signal state, and a steering wheel position.

18. The classification apparatus of claim 9 wherein the classification corresponds to a current condition of the sensor data.

19. The classification apparatus of claim 9 wherein the classification corresponds to a past condition of the sensor data.

20. A vehicle arranged and constructed to use a classification of an activity state of a driver comprising:
a classification apparatus using a statistical classifier for providing a signal corresponding to one of a maneuver and non-maneuver, wherein the statistical classifier used by the apparatus is at least one of a C4.5, a RIPPER, and a Quadratic classifier that is configured as an at least two-state activity classifier operable to recognize at least a first driving state corresponding to a maneuver activity and a second driving state corresponding to a non-maneuver activity, the signal being based on sensor data related to at least one operational condition; and
a device operable to use the signal for determining a timing for sending the driver an event.

21. The vehicle of claim 20 wherein when the signal corresponds to non-maneuver and the timing is immediate for notifying the driver of the event.

22. The vehicle of claim 20 wherein when the signal corresponds to maneuver and the timing is immediate for notifying the driver of the event.

23. The vehicle of claim 20 wherein the device is a wireless communication device.

24. The vehicle of claim 20 wherein the operational condition is one of a instrumentation condition, a vehicle control condition, an entertainment device condition, a driver condition, and a driver activity condition.

* * * * *